United States Patent
Braga

(10) Patent No.: US 8,166,994 B2
(45) Date of Patent: May 1, 2012

(54) BALL FOR VALVES AND PRODUCTION METHOD

(75) Inventor: Marco Braga, Vercellie (IT)

(73) Assignee: Vir Valvoindustria Ing. Rizzio—S.p.A., Valduggia, Vercelli (IT)

( * ) Notice: Subject to any disclaimer, the term of this patent is extended or adjusted under 35 U.S.C. 154(b) by 861 days.

(21) Appl. No.: 12/297,188

(22) PCT Filed: Apr. 12, 2007

(86) PCT No.: PCT/EP2007/003252
§ 371 (c)(1),
(2), (4) Date: Oct. 14, 2008

(87) PCT Pub. No.: WO2007/118666
PCT Pub. Date: Oct. 25, 2007

(65) Prior Publication Data
US 2009/0302259 A1    Dec. 10, 2009

(30) Foreign Application Priority Data
Apr. 13, 2006 (IT) .............................. MI2006A0740

(51) Int. Cl.
*F16K 5/06* (2006.01)
(52) U.S. Cl. ................. 137/15.22; 251/209; 251/315.16
(58) Field of Classification Search ............ 251/315.16, 251/315.01, 209, 208; 137/15.22; 29/890.128, 29/890.126, 890.132
See application file for complete search history.

(56) References Cited

U.S. PATENT DOCUMENTS

| | | | | |
|---|---|---|---|---|
| 3,403,887 A * | 10/1968 | Myers | ............................ | 251/209 |
| 3,773,291 A * | 11/1973 | Grauer | ......................... | 251/209 |
| 5,524,863 A * | 6/1996 | Davis | .............................. | 251/209 |
| 5,551,467 A | 9/1996 | Booth et al. | | |
| 5,593,135 A * | 1/1997 | Lester et al. | .................... | 251/209 |
| 5,937,890 A * | 8/1999 | Marandi | ................... | 251/315.16 |
| 6,109,591 A * | 8/2000 | Tuttle et al. | .................... | 251/208 |
| 6,412,756 B1 * | 7/2002 | Hayduk | .................... | 251/315.16 |
| 7,025,330 B2 * | 4/2006 | Massey | ..................... | 29/890.132 |
| 7,448,410 B2 * | 11/2008 | Keiser | ....................... | 137/625.47 |
| 2004/0256590 A1 * | 12/2004 | Pettinaroli | ............... | 251/315.01 |

FOREIGN PATENT DOCUMENTS

DE    37 29 255    11/1988
WO    WO 01/33120    5/2001

OTHER PUBLICATIONS

International Search Report dated Aug. 8, 2007, in PCT application.

* cited by examiner

*Primary Examiner* — John Bastianelli
(74) *Attorney, Agent, or Firm* — Young & Thompson

(57) ABSTRACT

A ball (1) for valves is described, comprising a substantially ball-shaped body (2), a hole (4, 5) bored in the body (2) for fluid flow passage between the entry and exit of the valve, and a slot (10) cut into the body (2) to house a pin for ball (1) rotation. The ball (1) is produced in a single element, and the hole (4, 5) terminates in a wall (6) in which a specifically shaped opening (12) is cut to regulate the amount of fluid flow between the entry and exit of the valve.

14 Claims, 3 Drawing Sheets

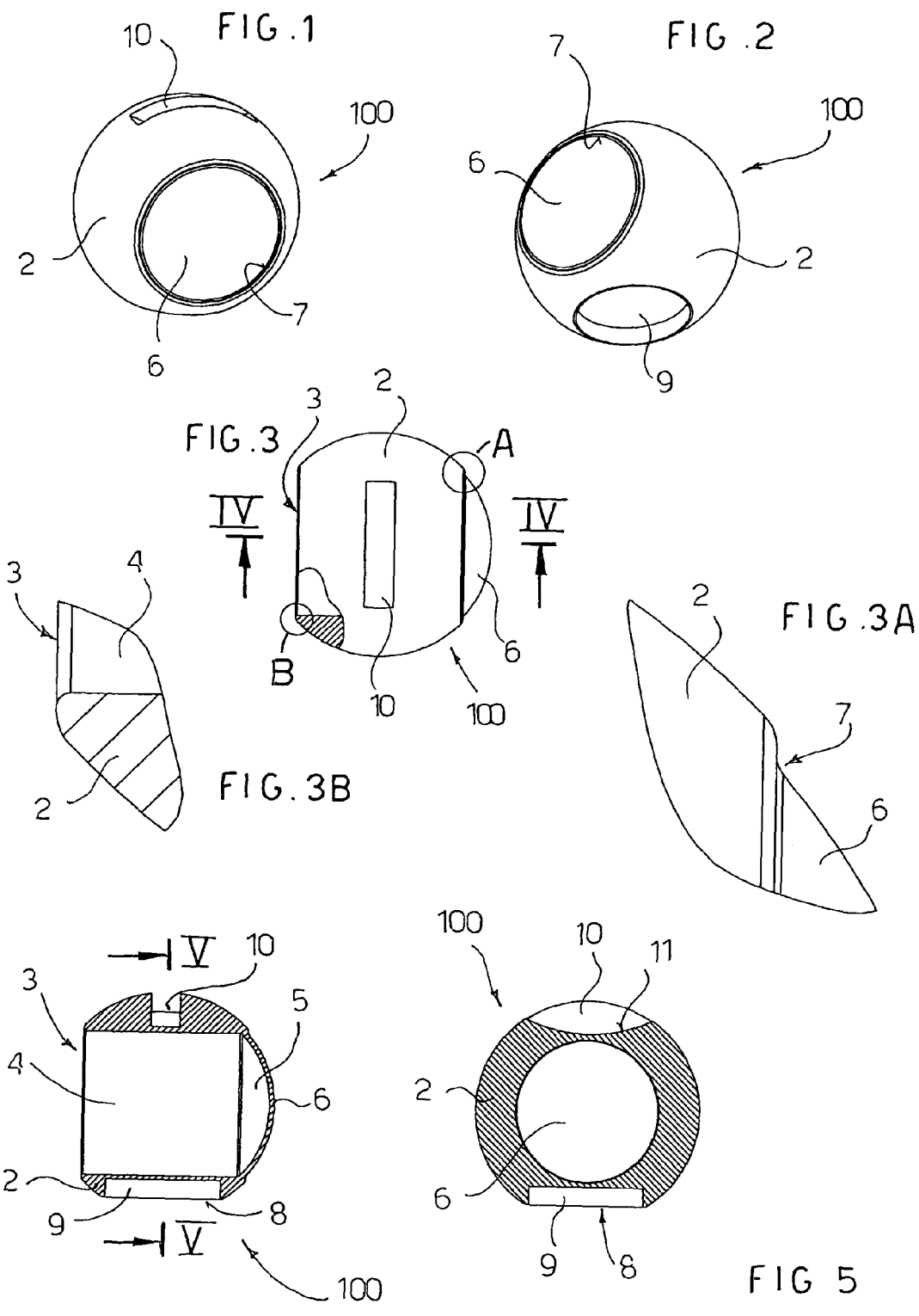

BALL FOR VALVES AND PRODUCTION METHOD

The present invention relates to a ball for valves and a method for its production.

Common valves generally comprise a ball-shaped closure system having a cylindrical through hole. When the ball is rotated, the opening on the valve is opened and closed, thus regulating the fluid flow passing through the valve.

These valves of prior art present certain drawbacks in relation to fluid flow regulation. In fact, the ball shown in FIG. 11 must be rotated at an angle $\theta$ that moves from $\theta_0$ to 90° in order to change from its completely closed position wherein the flow $\Phi$ is equal to zero, to its completely open position wherein the flow $\Phi$ coincides with the maximum flow $\Phi_{max}$. In the graph shown in FIG. 11, the flow curve has an inflection form and the flow variation is minimum both in the zone near the open position of the valve ($\theta<\theta_1$) as well as in the zone near the closed position of the valve ($\theta>\theta_2$). On the other hand a strong flow variation occurs in the central range ($\theta_1<\theta<\theta_2$), wherein $\theta_1\approx30°$ and $\theta_2\approx60°$. Therefore the true flow regulation zone is limited to a range of approximately 30°, in other words between $\theta_1$ and $\theta_2$ resulting in a limited manoeuvring zone.

Furthermore it should also be remembered for example, that the heat exchangers used in water heating systems generally provide a flow with an exponential characteristic with the concavity facing in a downward direction. As a result, in order to balance the flow characteristic of the heat exchangers, valves are required to provide a flow with a equipercentual characteristic, in other words, an exponential with a concavity facing upwards, as shown in FIG. 12. In this case the flow gradually increases because of the rotation of the ball which moves from its closed position to its open position. Therefore, a wide manoeuvring angle $\theta$ ranging between $\theta_0$ and 90° can be obtained, in order to have a flow regulation.

In order to resolve at least some of the aforesaid drawbacks, it is common to use specifically shaped plastic inserts introduced into the cylindrical hole in the balls. The shape of the inserts is formed to permit a flow with substantially equipercentual characteristics.

However this type of valve also presents certain drawbacks. In fact, it must be considered that the body of the ball is made of metal, generally brass, whereas the specifically shaped insert is made of plastic. For this reason the insert has lower mechanical resistance and is subject to a different thermal expansion than that of the ball. This often results in structural yield and breaking of the insert.

Moreover, the assembly of the insert inside the ball is rather complicated, and this provokes the possibility of alignment errors which are made even worse by the different thermal expansion in comparison to the ball.

To resolve at least part of the problems caused by the specifically shaped plastic inserts with the ball, other valves have been produced with several metal parts thus providing a specifically shaped opening. However, these valves also present problems mainly caused by the excessively long and costly production process that requires manual intervention to remove the burring that forms around the perimeter of the specifically shaped opening.

Furthermore the rim of the perimeter that forms the specifically shaped opening of the ball is on the same level as the seal surface of the ball and this interferes with the seals of the valve body that close the ball during its rotation. As a result, the seals are damaged and compromise the hermetic sealing action of the valve.

In fact to ensure a hermetic sealing action between the ball and seals, the ball must interfere as little as possible with the seal material. During rotation action, the sealing surface of the ball makes contact with the seal material and deforms it by compression action. In this case the rim of the ball opening does not have a suitable carefully rounded geometry, such as that of the transition between the through hole and the ball surface in a common on-off ball valve. As a result, the rim of the ball opening tends to pierce/cut the seal material.

The aim of the present invention is to eliminate the drawbacks of prior art by providing a ball for valves that is able to maximise the flow regulation zone and that is also reliable and versatile at the same time.

Another aim of the present invention is to provide a ball for valves that is also economical and easy to produce.

These aims are achieved according to the invention with the ball and relative production method, whose characteristics are listed respectively in the appended independent claims 1 and 9.

Advantageous embodiments of the invention will be provided in the subordinate claims.

The ball for valves according to the invention comprises:
a substantially ball-shaped body,
a through hole defined in the body to permit the passage of the fluid flow from the entry to the exit of the valve, and
a slot defined in the body to house a pin for ball rotation.

The ball is manufactured in a single element, and the through hole for the fluid passage terminates with a wall having a specifically shaped opening conceived to regulate the amount of fluid flow between the entry and exit of the valve.

The specifically shaped opening is punched so that the perimeter is defined with extreme precision, without the need for further hand finishing to remove burring.

Further characteristics of the invention will be made more apparent from the following detailed description of an embodiment provided simply as an example and to be considered by no means limiting, and illustrated in the appended drawings wherein:

FIGS. 1 and 2 are two views in perspective from different angles of a semi-finished ball for valves according to the invention;

FIG. 3 is a plane view, partially in cross-section of the ball in FIG. 1;

FIGS. 3A and 3B are two enlarged view of the details defined in the circles A and B in FIG. 3;

FIG. 4 is an axial section view seen from the sectional plane IV-IV in FIG. 3;

FIG. 5 is a cross section view seen from the sectional plane V-V in FIG. 4;

Figure 6:
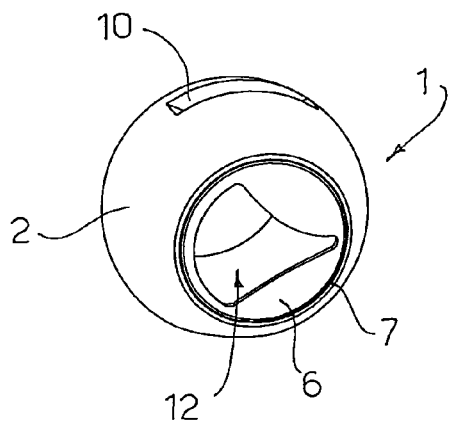
FIGS. 6 and 7 are two views in perspective from different angles of the ball for a valve according to the invention.
Figure 7:
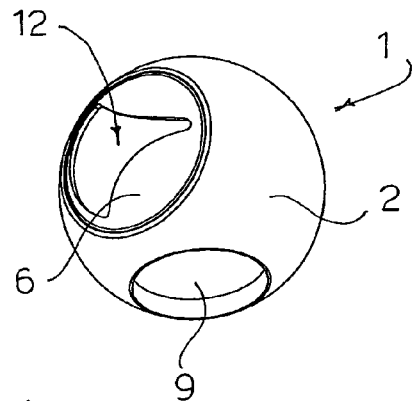
Figure 8:
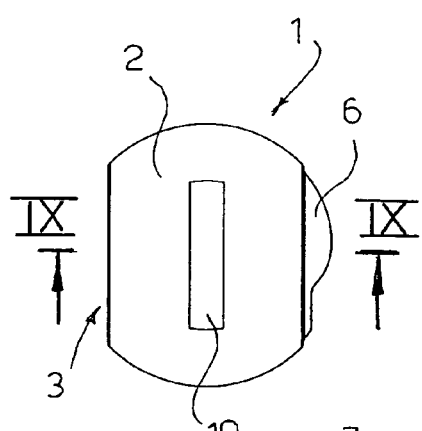
FIG. 8 is a plane view of the ball in FIG. 6.
Figure 9:
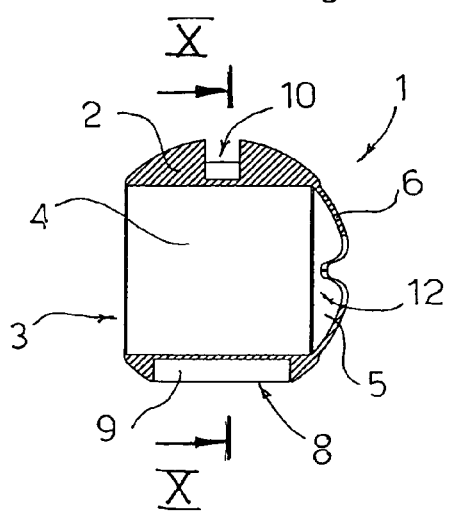
FIG. 9 is an axial section view from the sectional plane IX-IX of FIG. 8.

The ball for valves according to the invention will be described, with the aid of the appended figures, and identified throughout by the reference numeral 1, and illustrated in the FIGS. 6-8.

At this point, the process for producing a semi-finished element 100 used to obtain the ball 1 will be described referring to FIGS. 1-5.

A metal bar is machined on a numerically controlled, single or multi-chuck lathe to obtain a perfectly spherical body 2. A spherical cap portion of body 2 is removed along a cutting plane 3.

A blind cylindrical hole 4 is bored into the cutting plane 3 destined for the fluid passage. The cylindrical hole 4 has an axis at right-angles to the cutting plane 3 and proceeds with a terminating blind hole 5 having a spherical cap profile that forms a thin dome-shaped wall 6 in a position diametrically opposite the cutting plane 3.

The thickness of wall 6 is reduced further by machining the external surface to remove material. In this manner, wall 6 is defined by a circular perimetric rim 7, concentric with the ball-shaped body 2, but recessed in relation to the external surface of body 2.

Another spherical cap of body 2 is removed on a cutting plane 8. The cutting plane 8 is at right angles to the cutting plane 3 and parallel to the axis of hole 4. A blind cylindrical hole 9 is bored in plane 8 to define a centring undercut on the ball 1 which will be described below. The axis of undercut 9 is at right angles to the axis of hole 4 and the two axes meet exactly in the centre of the ball-shaped body 2.

A slot 10 is cut in the position diametrically opposite the centring undercut 9 to house a pin that connects ball 1 to the shaft of a motor or a manually operated handle. The slot 10 is cut in a plane at right angles to the axis of hole 4, and has a substantially circumferential configuration defined by a curved profile 11. (FIG. 5).

The semi-finished element 100 is placed on a punching mould equipped with a female punch or cutter and a male punch or cutter. The female punch has a spherical cap shaped head with a substantially triangular recess, while the male punch has a protruding blade with a substantially triangular shape complementary to the female punch recess.

The semi-finished element is centred on the punching mould using centring undercut 8 and the female punch is inserted into the hole 4 until the head of the female punch is in contact with wall 6. At this point the male punch is hammered onto the female punch to cut a predefined substantially triangular shaped opening in wall 6.

The portion of the cut wall falls inside the female punch and is expelled through hole 4. The finished ball 1 is obtained in this manner, as shown in FIGS. 6-10, presenting a substantially triangular opening 12 cut into wall 6 to regulate the fluid flow that passes through the ball 1, during the ball rotation.

Figure 10:
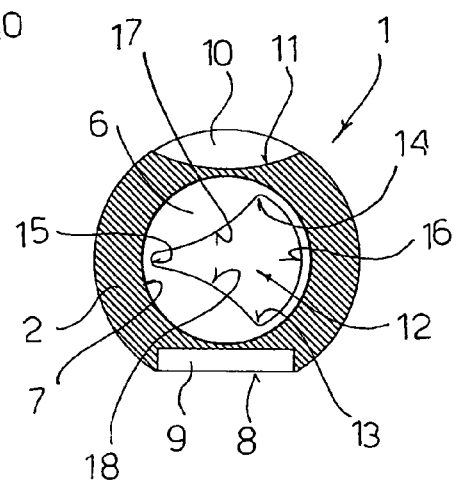
FIG. 10 is a cross section view from the sectional plane X-X of FIG. 9.
Figure 11:
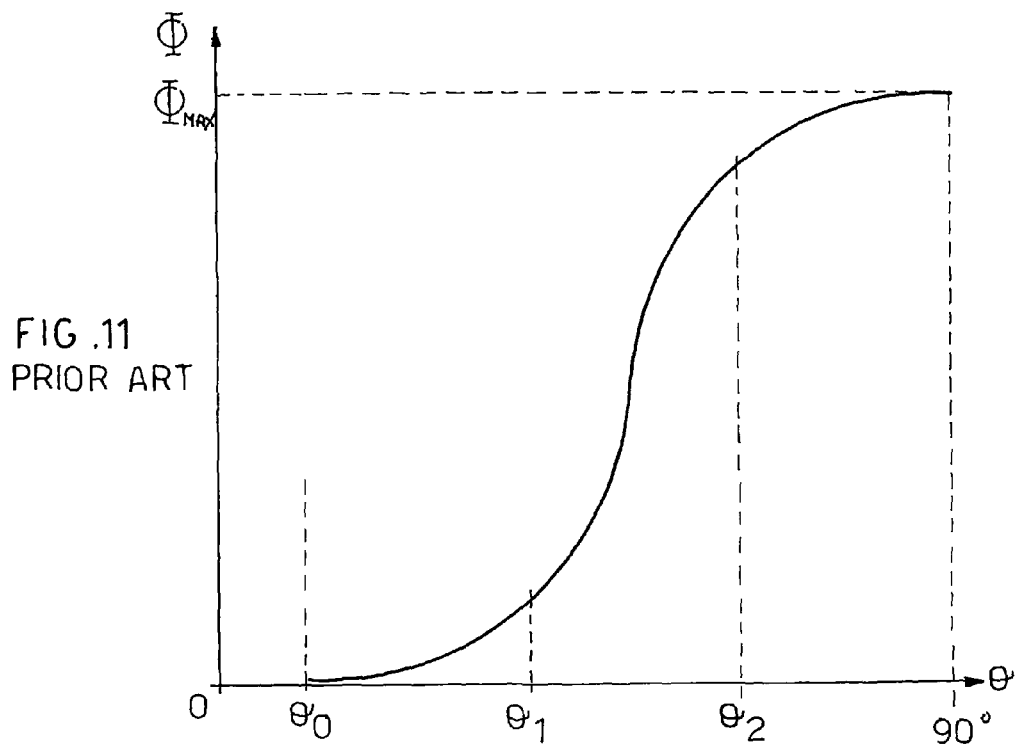
FIG. 11 is a graph showing the flow progress according to the rotation angle of the ball for a ball having a cylindrical through hole according to prior art.

In particular in reference to FIG. 10, the opening 12 presents three vertexes 13, 14, 15 arranged like the three vertexes of an isosceles or equilateral triangle inscribed in the circumference defined by rim 7 of wall 6. The profiles of sides 16, 17 and 18 of the triangle that unite the three vertexes 13, 14 and 15 are substantially curved.

More precisely the profile of the base 16 is concave in relation to the centre of the triangle and has a radius of curvature slightly less than the radius of curvature of the perimeter 7 of wall 6. On the other hand the profiles of the two cathetus 17 and 18 are convex in relation to the centre of the triangle.

Furthermore, it should be considered that the ball 1 is mounted to rotate hermetically inside a seal of the valve-body, between the entry and exit of the valve. Therefore by rotating the ball 1 along the axis of the cylindrical undercut course 9, this provokes the opening/closing action of the flow between the entry and exit of the valve. The external surface of wall 6 is slightly recessed in relation to the external surface of body 2. In this manner, during the rotation of the valve 1 the parts that project from the rim of opening 12 do not interfere with and do not make contact with the surface of the seal.

Figure 12:
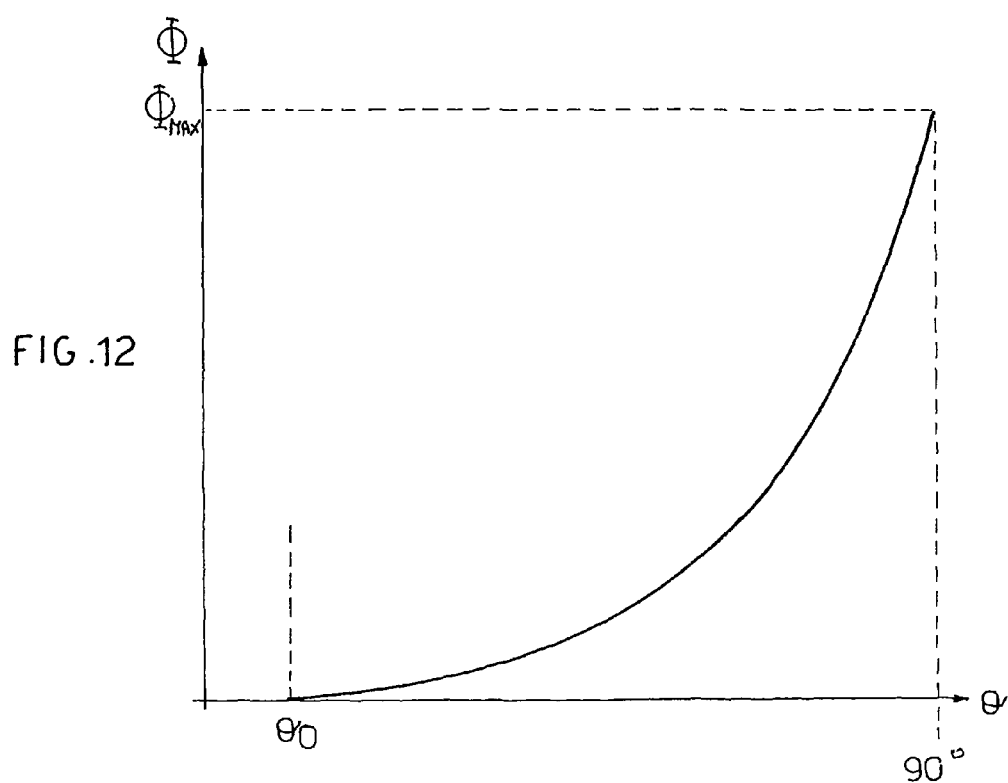
FIG. 12 is a graph showing the flow progress according to the rotation angle of the ball, for a ball with a specifically shaped opening according to the invention.

In addition, the specific configuration of the opening 12 provides greater precision in flow regulation through the valve, to obtain a flow having an equipercentual progress, substantially similar to that shown in FIG. 12.

Preferably, the specifically shaped ball 1 is manufactured in brass. However, it is also possible to use other materials such as stainless steel, bronze and similar alloys, or thermoplastic or thermosetting resins.

Preferably the opening in wall 6 is performed by cutting with a pair of punches. However, this can also be obtained using other methods that leave no burring on the profile, such as laser or high-pressure water cutting.

Furthermore, even though in the detailed description and the drawings, specific reference is made to an opening 12 having a substantially triangular shape to obtain an equipercentual flow characteristic, naturally opening 12 can be shaped with another configuration, already common in prior art, to obtain a different flow characteristic, such as rapid opening characteristics, with a square root, linear, modified parabolic or hyperbolic curve.

Numerous variations and modifications to detail can be applied to the present embodiment by those skilled in the art, while remaining within the scope of the invention described in the appended claims.

The invention claimed is:

1. Ball (1) for valves comprising:
a substantially ball-shaped body (2),
a hole (4, 5) bored in the body (2) for fluid flow passage between the entry and exit of the valve, and
a slot (10) provided into the body (2) to house a pin for ball (1) rotation,
characterised in that
said ball (1) is produced in a single element,
said hole (4, 5) terminates in a wall (6) in which a specifically shaped opening (12) is cut to regulate the amount of fluid flow between the entry and exit of the valve, and
said wall (6) of the ball having the specifically shaped opening is recessed in relation to the external surface of the ball.

2. Ball (1) according to claim 1, characterised in that said hole (4, 5) has a cylindrical configuration (4) terminating in a hole having a spherical cap shape (5), so that said wall (6) in which the specifically shaped hole is cut has a substantially spherical cap shape with a fine thickness and a circular perimetric rim (7).

3. Ball (I) according to claim 2, characterised in that said specifically shaped opening (12) has a substantially equilateral triangular configuration inscribed inside the perimeter (7) of the wall (6).

4. Ball (1) according to claim 3, characterised in that the profiles of the sides (16, 17, 18) of the triangle forming said specifically shaped opening (12) are substantially curved.

5. Ball (1) according to claim 4, characterised in that said isosceles or equilateral triangle that defines the opening (12) presents a base (16) and two cathetus (17, 18), and wherein the profile of the base (16) is concave in relation to the center of the triangle and has a radius of curvature slightly less than the radius of curvature of the perimeter (7) of the wall (6) and the profiles of the two cathetus (17, 18) are convex in relation to the center of the triangle.

6. Ball (1) according to claim 1, characterised in that it comprises a substantially cylindrical undercut (9) arranged in a direction diametrically opposite the slot (10) for the rotation pin of the ball, having an axis that passes through the center of the ball (1) and at right angles to the axis of the hole (4) for the passage of the fluid flow, said cylindrical undercut (9) acting as a reference point for centering the ball during the culling of the specifically shaped opening (12).

7. Ball (1) according to claim 1 characterised in that it is produced in brass.

8. Method for the production of a ball (1) for valves according to claim 3, comprising the following stages:
   mechanical machining of a metal bar in order to obtain a body (2) that is substantially ball-shaped,
   cutting of a slot (10) on the external surface of the body to house a pin for ball rotation,
   boring of a blind hole (4, 5) terminating in a wall (6),
   punching or cutting of the wall (6) in a manner to obtain a specifically shaped opening (12) conceived to regulate the amount of fluid flow between the entry and exit of the valve,
   wherein the cutting action in the wall (6) is performed by means of a pair of male and female punches.

9. Method according to claim 8, characterised in that the female punch is positioned inside said hole (4, 5) in contact with the internal surface of the wall (6) and that the male punch operates on the external surface of the wall (6).

10. Method according to claim 8, characterised in that before said punch culling stage, a mechanical machining stage creates a centering undercut (9) in a direction diametrically opposite the slot (10) for the rotation pin of the ball, having an axis that passes through the center of the ball (1) and at right angles to the axis of the hole (4) for the passage of the fluid flow, said centering undercut (9) being used to center said male and female punches.

11. Method according to claim 8, characterised in that it comprises a mechanical machining stage on the external surface of said wall (6) in which the specifically shaped opening (12) is obtained, in a manner to reduce the diameter of said wall (6) in relation to the external surface of the ball (1).

12. Method according to claim 9, characterised in that before said punch culling stage, a mechanical machining stage creates a centering undercut (9) in a direction diametrically opposite the slot (10) for the rotation pin of the ball, having an axis that passes through the center of the ball (1) and at right angles to the axis of the hole (4) for the passage of the fluid flow, said centering undercut (9) being used to center said male and female punches.

13. Method according to claim 9, characterised in that it comprises a mechanical machining stage on the external surface of said wall (6) in which the specifically shaped opening (12) is obtained, in a manner to reduce the diameter of said wall (6) in relation to the external surface of the ball (1).

14. Method according to claim 10, characterised in that it comprises a mechanical machining stage on the external surface of said wall (6) in which the specifically shaped opening (12) is obtained, in a manner to reduce the diameter of said wall (6) in relation to the external surface of the ball (1).

* * * * *